United States Patent
Blitzer et al.

(10) Patent No.: US 9,195,631 B1
(45) Date of Patent: Nov. 24, 2015

(54) PROVIDING HISTORICAL DATA TO AN EVENT-BASED ANALYSIS ENGINE

(75) Inventors: Aharon Blitzer, Shoham (IL); Aviram Katz, Kiryat Onno (IL); Amit Lieberman, Raanana (IL); Amihai Hadar, Herzelia (IL); Senya Touretski, Ramat Gan (IL)

(73) Assignee: EMC Corporation, Hopkinton, MA (US)

( * ) Notice: Subject to any disclaimer, the term of this patent is extended or adjusted under 35 U.S.C. 154(b) by 302 days.

(21) Appl. No.: 13/429,524

(22) Filed: Mar. 26, 2012

(51) Int. Cl.
*G06F 17/00* (2006.01)

(52) U.S. Cl.
CPC ..................................... *G06F 17/00* (2013.01)

(58) Field of Classification Search
CPC .......... G06F 17/00; G06N 5/02; G06N 5/025; G06N 5/04; G06N 99/005
USPC .......................................... 706/47, 46, 45, 62
See application file for complete search history.

(56) References Cited

U.S. PATENT DOCUMENTS

| | | | |
|---|---|---|---|
| 7,076,685 B2 | 7/2006 | Pillai et al. | |
| 7,409,379 B1 | 8/2008 | Katzer | |
| 7,482,931 B2 | 1/2009 | Lin | |
| 7,606,813 B1 | 10/2009 | Gritsay et al. | |
| 7,613,726 B1 | 11/2009 | Spivak et al. | |
| 7,668,953 B1 | 2/2010 | Sinclair et al. | |
| 7,761,594 B1 | 7/2010 | Mowat | |
| 7,836,427 B1 | 11/2010 | Li et al. | |
| 8,224,761 B1 | 7/2012 | Rockwood | |
| 2004/0093581 A1 | 5/2004 | Nielsen et al. | |
| 2004/0117407 A1 | 6/2004 | Kumar et al. | |
| 2004/0250258 A1 | 12/2004 | Raghuvir et al. | |
| 2005/0125688 A1 | 6/2005 | Ogawa et al. | |
| 2005/0246304 A1 | 11/2005 | Knight et al. | |
| 2006/0179028 A1* | 8/2006 | Bram et al. | 706/47 |
| 2006/0179042 A1* | 8/2006 | Bram et al. | 707/3 |
| 2006/0179058 A1* | 8/2006 | Bram et al. | 707/9 |
| 2007/0094199 A1 | 4/2007 | Deshpande et al. | |
| 2007/0260470 A1* | 11/2007 | Bornhoevd et al. | 705/1 |
| 2008/0196006 A1 | 8/2008 | Bates et al. | |
| 2009/0019000 A1 | 1/2009 | Arends et al. | |
| 2009/0113387 A1 | 4/2009 | Ziegler | |
| 2009/0150319 A1 | 6/2009 | Matson et al. | |
| 2009/0171879 A1 | 7/2009 | Bullen et al. | |
| 2009/0287628 A1* | 11/2009 | Indeck et al. | 706/47 |
| 2010/0128676 A1 | 5/2010 | Wu et al. | |
| 2010/0175055 A1 | 7/2010 | Wang et al. | |

(Continued)

OTHER PUBLICATIONS

Blitzer et al.; "Managing a Memory of an Event-Based Analysis Engine;" U.S. Appl. No. 13/534,461, filed Jun. 27, 2012; 22 pages.

(Continued)

*Primary Examiner* — Jeffrey A Gaffin
*Assistant Examiner* — Ilya Traktovenko
(74) *Attorney, Agent, or Firm* — Daly, Crowley, Mofford & Durkee, LLP

(57) ABSTRACT

Several aspects for providing historical information to an event based image include a method, an apparatus and an article. One or more of the aspects includes receiving a trigger associated with a rule, determining if the rule requires that historical information be provided to an event-based analysis engine, filtering out events not needed by the rule if the rule requires historical information and providing the event-based analysis engine with historical information based on the filtering.

20 Claims, 4 Drawing Sheets

(56) References Cited

U.S. PATENT DOCUMENTS

| | | | |
|---|---|---|---|
| 2010/0198636 A1* | 8/2010 | Choudhary et al. | ............... 705/7 |
| 2011/0138291 A1 | 6/2011 | Twiddy et al. | |
| 2011/0141913 A1 | 6/2011 | Clemens et al. | |
| 2011/0167433 A1* | 7/2011 | Appelbaum et al. | .......... 719/318 |
| 2011/0191692 A1* | 8/2011 | Walsh et al. | .................. 715/752 |
| 2011/0238452 A1 | 9/2011 | Ziade et al. | |
| 2012/0131185 A1 | 5/2012 | Petersen et al. | |
| 2012/0291008 A1 | 11/2012 | Bates et al. | |
| 2012/0317504 A1 | 12/2012 | Patel et al. | |
| 2013/0132108 A1 | 5/2013 | Solilov et al. | |
| 2013/0191185 A1 | 7/2013 | Galvin | |
| 2014/0165140 A1 | 6/2014 | Singla et al. | |

OTHER PUBLICATIONS

Blitzer et al.; "Simplifying Rules Generation for an Event-Based Analysis Engine by Allowing a User to Combine Related Objects in a Rule;" U.S. Appl. No. 13/533,159, filed Jun. 26, 2012; 29 pages.

Blitzer et al.; "Simplifying Rules Generation for an Event-Based Analysis Engine;" U.S. Appl. No. 13/534,458, filed Jun. 27, 2012; 30 pages.

Blitzer, et al.; "Using Data Aggregation to Manage a Memory for an Event-Based Analysis Engine;" U.S. Appl. No. 13/727,855, filed Dec. 27, 2012; 18 Pages.

Office Action date Jul. 17, 2014 corresponding to U.S. Appl. No. 13/534,481, 10 Pages.

Office Action dated Feb. 13, 2014 corresponding to U.S. Appl. No. 13/533,159, 14 Pages.

Response to Office Action dated Feb. 13, 2014 corresponding to U.S. Appl. No. 13/533,159; Response filed Aug. 8, 2014, 12 Pages.

Office Action dated Jan. 31, 2014 corresponding to U.S. Appl. No. 13/534,488, 23 Pages.

Response to Office Action dated Jan. 31, 2014 corresponding to U.S. Appl. No. 13/534,488; Response filed Jul. 30, 2014, 13 Pages.

Final Office Action dated Mar. 26, 2015 corresponding to U.S. Appl. No. 13/534,488; 25 Pages.

Office Action from the U.S. Patent and Trademark Office dated Dec. 10, 2014 corresponding to U.S. Appl. No. 13/727,855; 14 Pages.

Tucker et al., "Method of Processing Events for Real-Time Analysis of Key Processes of an Enterprise;" Patent Application AU 2010212459; Filed Aug. 20, 2010; Published Mar. 24, 2011; 34 Pages.

Notice of Allowance dated Nov. 5, 2014 corresponding to U.S. Appl. No. 13/534,481; 9 Pages.

Response filed May 11, 2015 to Office Action dated Dec. 10, 2014; for a U.S. Appl. No. 13/727,855; 19 pages.

Notice of Allowance dated May 29, 2015 corresponding to U.S. Appl. No. 13/727,855; 19 Pages.

Appeal Brief dated Jun. 12, 2015 corresponding to U.S. Appl. No. 13/533,159; 21 Pages.

Request for Continued Examination (RCE) with a Response to Final Office Action dated May 11, 2015 corresponding to U.S. Appl. No. 13/534,488; RCE and Response filed Jun. 26, 2015; 15 Pages.

Non-Final Office Action dated Jul. 31, 2015 corresponding to U.S. Appl. No. 13/534,488; 22 Pages.

* cited by examiner

PROVIDING HISTORICAL DATA TO AN EVENT-BASED ANALYSIS ENGINE

BACKGROUND

An event-based analysis engine reacts to one or more events. For example, if an event occurs, the event-based analysis engine performs an action based on a rule. In one particular example, the event may be based on historical information.

SUMMARY

In one aspect, a method includes receiving a trigger associated with a rule, determining if the rule requires that historical information be provided to an event-based analysis engine, filtering out events not needed by the rule if the rule requires historical information and providing the event-based analysis engine with historical information based on the filtering.

In another aspect, an article includes a non-transitory machine-readable medium that stores executable instructions to provide data to an event-based analysis engine. The instructions cause a machine to receive a trigger associated with a rule, determine if the rule requires that historical information be provided to an event-based analysis engine, filter out events not needed by the rule if the rule requires historical information and provide the event-based analysis engine with historical information based on the filtering.

In a further aspect, an apparatus includes circuitry to provide data to an event-based analysis engine and configured to receive a trigger associated with a rule, determine if the rule requires that historical information be provided to an event-based analysis engine, filter out events not needed by the rule if the rule requires historical information and provide the event-based analysis engine with historical information based on the filtering.

DETAILED DESCRIPTION

Described herein are techniques to provide historical data to an event-based analysis engine. For example, the historical data is provided automatically (without user intervention). In one particular example, the historical data is provided using a generic and/or rule-specific loading mechanism. In one example, the techniques described herein work even if the rules and events that are stored in a memory of the event-based analysis engine are lost, for example, due to a restart of the event-based analysis engine.

Figure 1:
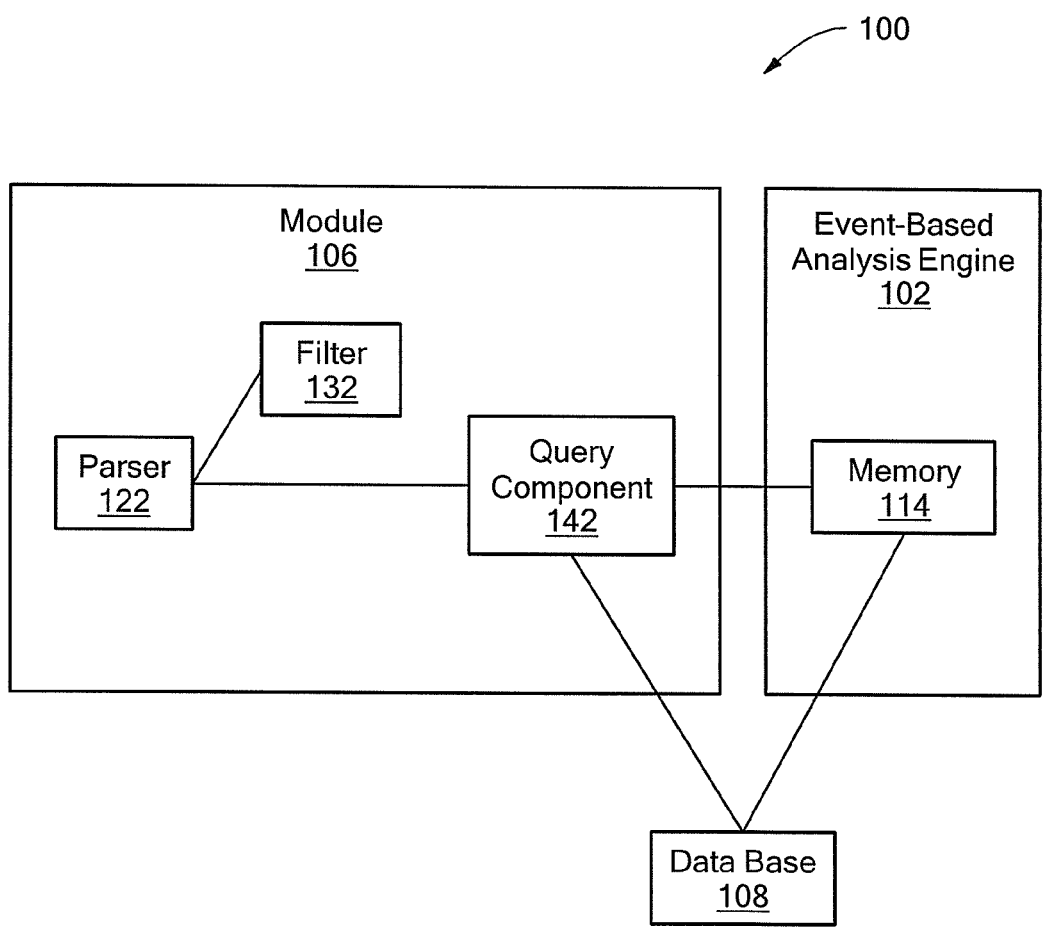
FIG. 1 is a block diagram of an example of a system to provide historical data to an event-based analysis engine.

Referring to FIG. 1, a system 100 includes an event-based analysis engine 102, a module 106 and a database 108. The rules are stored in a database 108. The event-based analysis engine 102 compiles the rules and includes a memory 114 configured to store the rules and historical data. In one example, the module 106 reads the rules from the database 108 (e.g., after the module 106 receives an event to load a rule into the event-based analysis engine 102) and whenever a new event is reached for loading a rule to the event-based analysis engine 102, the module 106 receives this rule as well.

The module 106 includes a parser 122, filter 132 and a query component 142. The parser 122 parses a rule and identifies whether a rule requires historical data. For example, the parser 122 is configured to recognize a rule that requires historical data if at least one of the following conditions are true: (1) the rule includes a statistical operator, (2) the rule includes a change management operator; and (3) the rule correlates between two or more event types. The statistical operator is used to run a calculation of a metric over a time period requiring all the events or the aggregation of the events for the time period. The change management operator determines if data has changed so that historical data is required to determine whether the data has changed from one point in time to another point in time. The rule correlating between two or more event types means that the rule is required to store an event associated with a required event type so that whenever a new event (one of the required event types) is received, the rule can be executed.

The rules are evaluated when an event is sent to the event-based analysis engine 102. The event-based analysis engine is configured to recognize which rules to evaluate based on the event that is received. In an example where the rule is required to check a condition for more than one event (which are not received at the same time), the event-based analysis engine 102 keeps the events for both types in memory 114 so whenever it receives both events event-based analysis engine 102 can start evaluating the rule condition.

If historical data is required, the parser 122 provides the required objects (e.g., a host, disk and so forth), event types (e.g., a backup job, CPU utilization, disk status and so forth) and a time period to the filter 132.

The filter 132 filters out any event that is not required by the rule and returns the results back to the parser 122. For example, if a rule requires that a backup state of a backup job be successful, then any backup that is not successful is filtered out. The information that will be sent in this example are the backup jobs events that are needed for the enabled rules (i.e., just for the backup servers that the rule is enabled on, the backup jobs for the required time period and just the backup jobs whose state is exactly what is required by the rule).

The parser 122 provides the filtered results from the input filter 132 to the query component 142. The query component 142 receives the filtered results from the parser 122 and queries the database 108 to retrieve the historical data and provides the historical information to the event-based engine 102.

Figure 2:
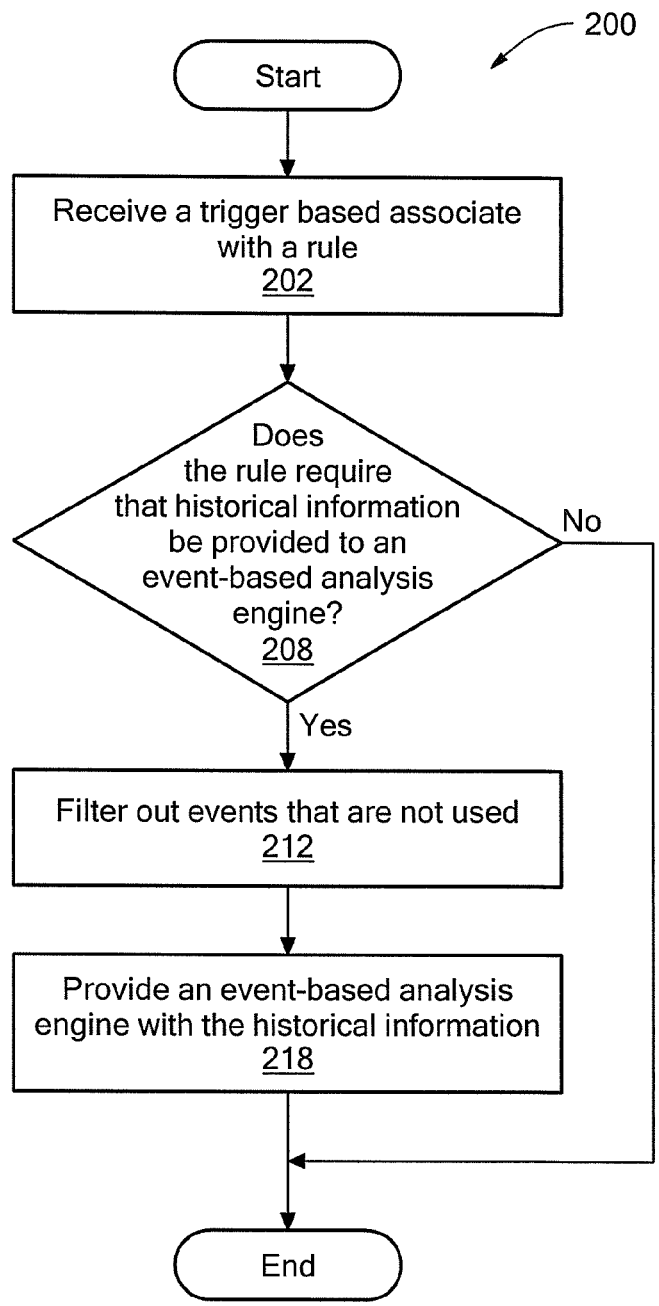
FIG. 2 is a flowchart of an example of a process to provide historical data to an event-based analysis engine.

Referring to FIG. 2, an example of a process to provide automatically historical data to the event-based analysis engine 102 is a process 200. Process 200 receives a trigger associated with a rule (202). For example, whenever the event-based analysis engine 102 loads/reloads a rule, the module 106 is triggered. In another example, the module 106 may be triggered if the event-based analysis engine 102 restarts (and then all the enabled rules are reloaded). In a further example, the module 106 is triggered whenever a rule is enabled, whenever a rule is assigned to a new node, whenever a rule is modified and so forth.

Process 200 determines if the rule will require that historical data be provided to an event-based analysis engine (208). For example, the rule contains at least one of a statistical operator, a change management operator or a correlation between two or more event types.

If the rule will require historical data be provided to the event-based analysis engine, then process 200 filters out events that are not required (212).

Process 200 provides event-based analysis engine with the required information (218). For example, the query component 142 searches the database 108 and provides the memory 114 of the event-based analysis engine 102 with the historical data.

Figure 3:
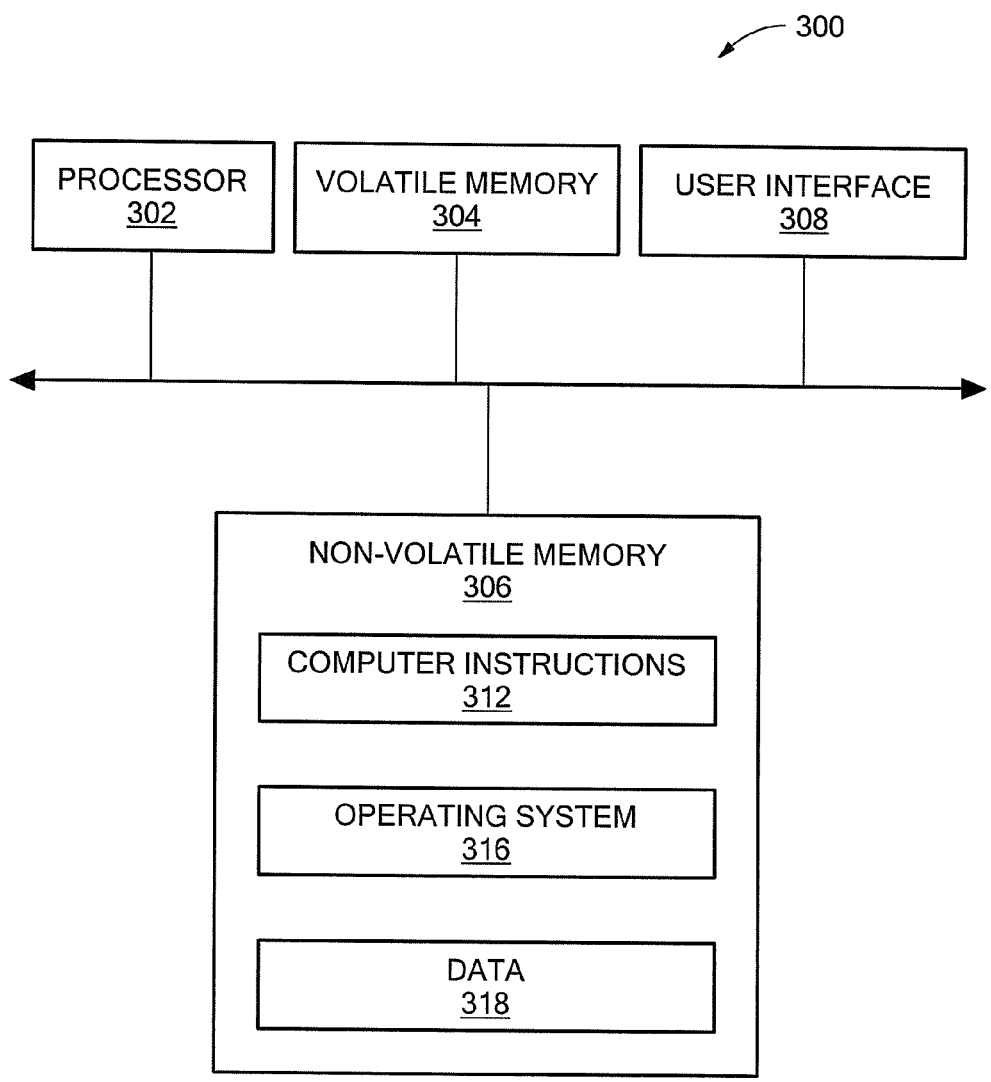
FIG. 3 is a block diagram of a computer on which the process of FIG. 2 may be implemented.

Referring to FIG. 3, an example of the module 106 is a computer 300. The computer 300 includes a processor 302, a volatile memory 304, a non-volatile memory 306 (e.g., hard disk) and a user interface (UI) 308 (e.g., a mouse, a keyboard, a display, touch screen and so forth). The non-volatile memory 306 stores computer instructions 312, an operating system 316 and data 318. In one example, the computer instructions 312 are executed by the processor 302 out of volatile memory 304 to perform all or part of the processes described herein (e.g., the process 200).

The processes described herein (e.g., the process 200) are not limited to use with the hardware and software of FIG. 3; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The system and processes described herein are not limited to the specific examples described.

Figure 4:
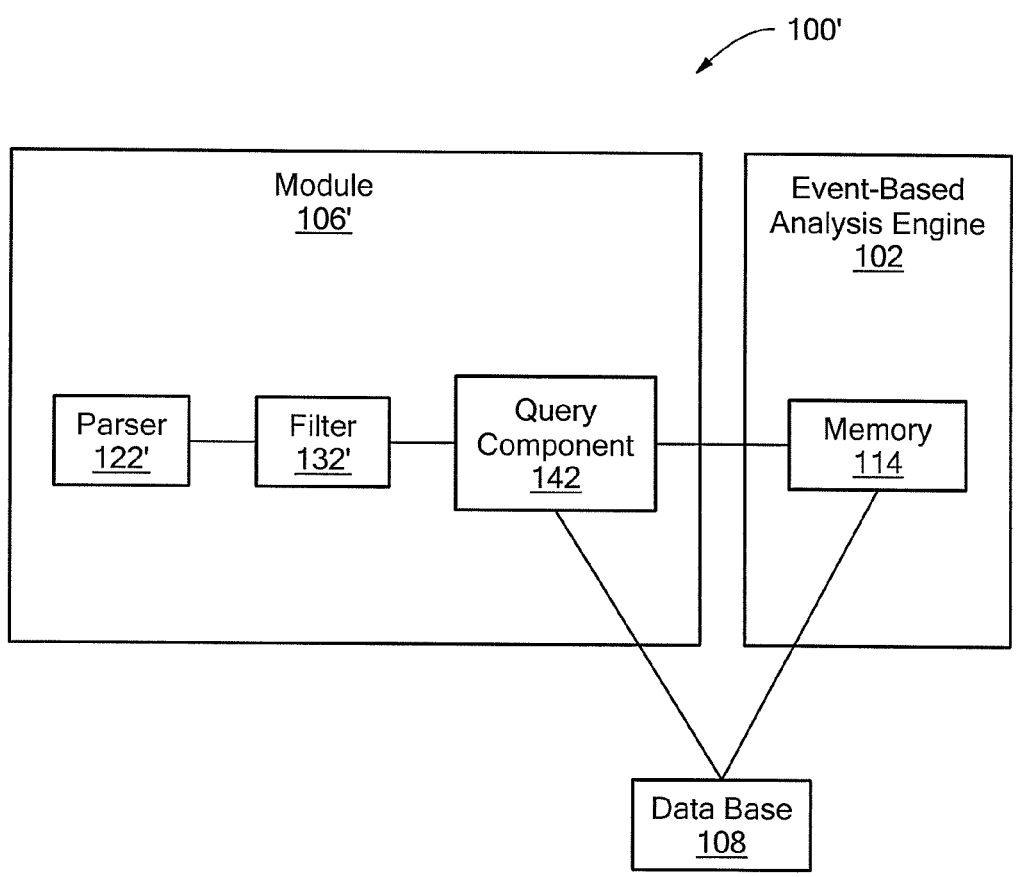
FIG. 4 is a block diagram of another example of a system to provide historical data to an event-based analysis engine.

For example, referring to FIG. 4, the module 106, the parser 122 and the filter 132 of FIG. 3 may be replaced by a module 106', a parser 122' and a filter 132' respectively, to form a system 100'. In this configuration, the filter 132' filters the data from the parser 122' and supplies the filtered data directly to the query component 142 without, as shown in FIG. 3, sending the information back to the parser 122'.

In another example, the process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200 of FIG. 2) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
    receiving a trigger associated with a rule;
    determining, using a parser, if the rule requires that historical information be provided to an event-based analysis engine in response to receiving the trigger comprising determining if the rule comprises a change management operator to determine whether data has changed from one point in time to another point in time;
    filtering out, using a filter, events not needed by the rule if the rule requires historical information;
    sending the filtered events from the filter to a query component;
    retrieving the historical data from a database using the query component; and
    providing the event-based analysis engine with the historical information based on the filtering by providing the historical information retrieved from the query component to a memory of the event-based analysis engine.

2. The method of claim 1 wherein determining if a rule requires historical information comprises determining if the rule comprises a statistical operator.

3. The method of claim 1 wherein determining if a rule requires historical information comprises determining if the rule correlates between two or more event types.

4. The method of claim 1, wherein receiving the trigger comprises:
    receiving the trigger if the event-based analysis engine loads or reloads the rule;
    receiving the trigger if the event-based analysis engine restarts; and
    receiving a trigger if one of: the rule is enabled, the rule is assigned to a new node or the rule is modified.

5. The method of claim 1, wherein determining if a rule requires historical information further comprises determining if the rule comprises a statistical operator and determining if the rule correlates between two or more event types,
    wherein the statistical operator is used to run a calculation of a metric over a time period requiring events required by the rule or the aggregation of the events for the time period.

6. The method of claim 5, wherein storing the events in the memory of the event-based analysis engine, if the rule correlates between two or more events.

7. The method of claim 1, wherein storing the events in the memory of the event-based analysis engine, if the rule correlates between two or more events.

8. The method of claim 1, wherein receiving the trigger comprises receiving the trigger after the rule is modified.

9. An article comprising:
a non-transitory machine-readable medium that stores executable instructions to provide data to an event-based analysis engine, the instructions causing a machine to:
receive a trigger associated with a rule;
determine, using a parser, if the rule requires that historical information be provided to an event-based analysis engine in response to receiving the trigger comprising instructions causing the machine to determine if the rule comprises a change management operator to determine whether the data has changed from one point in time to another point in time;
filter out, using a filter, events not needed by the rule if the rule requires historical information;
send the filtered events from the filter to a query component;
retrieve the historical data from a database using the query component; and
provide the event-based analysis engine with the historical information based on the filtering by providing the historical information retrieved from the query component to a memory of the event-based analysis engine.

10. The article of claim 9 wherein the instructions causing the machine to determine if a rule requires historical information comprises instructions causing the machine to determine if the rule comprises a statistical operator.

11. The article of claim 9 wherein the instructions causing the machine to determine if a rule requires historical information comprises instructions causing the machine to determine if the rule correlates between two or more event types.

12. The article of claim 9, wherein the instructions causing the machine to receive the trigger comprises instructions causing the machine to:
receive the trigger if the event-based analysis engine loads or reloads the rule;
receive the trigger if the event-based analysis engine restarts; and
receive a trigger if one of: the rule is enabled, the rule is assigned to a new node or the rule is modified.

13. The article of claim 9, wherein the instructions causing the machine to determine if a rule requires historical information further comprises instructions causing the machine to determine if the rule comprises a statistical operator and determine if the rule correlates between two or more event types,
wherein the statistical operator is used to run a calculation of a metric over a time period requiring events required by the rule or the aggregation of the events for the time period.

14. The article of claim 13, wherein storing the events in the memory of the event-based analysis engine, if the rule correlates between two or more events.

15. An apparatus, comprising:
circuitry configured to provide data to an event-based analysis engine and configured to:
receive a trigger associated with a rule;
determine, using a parser, if the rule requires that historical information be provided to an event-based analysis engine in response to receiving the trigger, comprising circuitry configured to determine if the rule comprises a change management operator to determine whether the data has changed from one point in time to another point in time;
filter out, using a filter, events not needed by the rule if the rule requires historical information;
send the filtered events from the filter to a query component;
retrieve the historical data from a database using the query component; and
provide the event-based analysis engine with the historical information based on the filtering by providing the historical information retrieved from the query component to a memory of the event-based analysis engine.

16. The apparatus of claim 15 wherein the circuitry comprises at least one of a processor, a memory, programmable logic and logic gates.

17. The apparatus of claim 15 wherein the circuitry to determine if a rule requires historical information comprises circuitry configured to determine if the rule comprises a statistical operator.

18. The apparatus of claim 15 wherein the circuitry to determine if a rule requires historical information comprises circuitry configured to determine if the rule correlates between two or more event types.

19. The apparatus of claim 15, wherein the circuitry to receive the trigger comprises circuitry configured to:
receive the trigger if the event-based analysis engine loads or reloads the rule;
receive the trigger if the event-based analysis engine restarts; and
receive a trigger if one of: the rule is enabled, the rule is assigned to a new node or the rule is modified.

20. The apparatus of claim 15, wherein the circuitry to determine if a rule requires historical information further comprises circuitry configured to determine if the rule comprises a statistical operator and determine if the rule correlates between two or more event types,
wherein the statistical operator is used to run a calculation of a metric over a time period requiring events required by the rule or the aggregation of the events for the time period.

* * * * *